US009236048B2

(12) United States Patent
Li et al.

(10) Patent No.: US 9,236,048 B2
(45) Date of Patent: Jan. 12, 2016

(54) METHOD AND DEVICE FOR VOICE CONTROLLING

(75) Inventors: Manhai Li, Shenzhen (CN); Kaili Xiao, Shenzhen (CN); Jingping Wang, Shenzhen (CN); Xin Liao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 535 days.

(21) Appl. No.: 13/575,717

(22) PCT Filed: Jan. 12, 2011

(86) PCT No.: PCT/CN2011/070198
§ 371 (c)(1),
(2), (4) Date: Jul. 27, 2012

(87) PCT Pub. No.: WO2011/134288
PCT Pub. Date: Nov. 3, 2011

(65) Prior Publication Data
US 2013/0289995 A1  Oct. 31, 2013

(30) Foreign Application Priority Data

Apr. 27, 2010  (CN) .......................... 2010 1 0165495

(51) Int. Cl.
*G10L 15/00* (2013.01)
*G10L 15/04* (2013.01)
(Continued)

(52) U.S. Cl.
CPC ................. *G10L 15/04* (2013.01); *G10L 15/22* (2013.01); *G10L 15/18* (2013.01); *G10L 2015/221* (2013.01); *G10L 2015/223* (2013.01); *G10L 2015/228* (2013.01); *H04M 2250/74* (2013.01)

(58) Field of Classification Search
CPC ......... G10L 15/08; G10L 15/02; G10L 15/18; G10L 15/19; G10L 15/30; G10L 15/22; G10L 15/07; G10L 15/26; G10L 15/265; G10L 17/00; G10L 19/20; G10L 21/02; H04M 1/271; H04M 3/4936
See application file for complete search history.

(56) References Cited

U.S. PATENT DOCUMENTS 5,956,681 A * 9/1999 Yamakita .......... H04M 1/72552
704/231
6,058,166 A * 5/2000 Osder ................... H04M 3/493
379/88.05

(Continued)

FOREIGN PATENT DOCUMENTS

CN      1389852 A      1/2003
CN      1783213 A      6/2006

(Continued)

OTHER PUBLICATIONS

International Search Report for PCT/CN2011/070198 dated Mar. 28, 2011.

*Primary Examiner* — Abdelali Serrou
(74) *Attorney, Agent, or Firm* — Ling Wu; Stephen Yang; Ling and Yang Intellectual Property

(57) ABSTRACT

The present invention discloses a method and device for voice control, which are used to solve the problem of low success rate of voice control in the prior art. The method includes: classifying stored recognition information used for voice recognizing to obtain a syntax packet corresponding to each type of recognition information (10); receiving an inputted voice signal, and performing a voice recognition processing respectively on the received voice signal by using each obtained syntax packet in turn (20), and performing a corresponding control processing based on a voice recognition result of the voice signal according to each syntax packet (30).

13 Claims, 4 Drawing Sheets

(51) Int. Cl.
*G10L 15/18* (2013.01)
*G10L 15/22* (2006.01)

(56) References Cited

U.S. PATENT DOCUMENTS

| | | | | |
|---|---|---|---|---|
| 6,249,765 | B1 * | 6/2001 | Adler et al. | 704/500 |
| 6,728,348 | B2 * | 4/2004 | Denenberg et al. | 379/93.18 |
| 7,331,036 | B1 | 2/2008 | Hambleton et al. | |
| 8,055,502 | B2 * | 11/2011 | Clark et al. | 704/270 |
| 8,214,213 | B1 * | 7/2012 | Ljolje | 704/251 |
| 8,868,424 | B1 * | 10/2014 | Moore et al. | 704/270.1 |
| 2001/0010714 | A1 * | 8/2001 | Nemoto | 379/88.01 |
| 2001/0016813 | A1 * | 8/2001 | Brown et al. | 704/231 |
| 2003/0105633 | A1 | 6/2003 | Delaunay et al. | |
| 2004/0085162 | A1 | 5/2004 | Agarwal et al. | |
| 2004/0138890 | A1 * | 7/2004 | Ferrans et al. | 704/270.1 |
| 2004/0162731 | A1 * | 8/2004 | Yamada | G10L 15/16 704/270.1 |
| 2005/0043067 | A1 * | 2/2005 | Odell | G10L 15/26 455/569.2 |
| 2005/0065796 | A1 * | 3/2005 | Wyss et al. | 704/270 |
| 2006/0018440 | A1 * | 1/2006 | Watkins et al. | 379/88.01 |
| 2007/0150276 | A1 * | 6/2007 | Srivastava | H04L 12/585 704/246 |
| 2008/0255850 | A1 * | 10/2008 | Cross et al. | 704/275 |
| 2008/0300025 | A1 * | 12/2008 | Song | H04M 1/6066 455/569.1 |
| 2009/0048839 | A1 * | 2/2009 | Sakai | 704/257 |

FOREIGN PATENT DOCUMENTS

| | | |
|---|---|---|
| CN | 101369425 A | 2/2009 |
| GB | 2367399 A | 4/2002 |
| JP | 10-187185 A | 7/1998 |
| WO | 2009048434 A1 | 4/2009 |

* cited by examiner

METHOD AND DEVICE FOR VOICE CONTROLLING

TECHNICAL FIELD

The embodiments of the invention relates to the field of voice recognition and communication technology, and in particular, to a method and device for voice control.

BACKGROUND ART

In order that people can use various services provided by the terminal equipment fast and conveniently without pressing the keys in a particular scene, the voice control technology arises accordingly. People only need to speak out various instructions near a microphone of the terminal equipment, and the terminal equipment can perform the corresponding processing according to the instructions. By taking voice dialing as an example, in order that people who cannot press keys with hands being occupied (for example when driving a vehicle) or who do not have sound upper limbs can also dial the phone, this technology can recognize the information required by dialing the phone from the user's voice, and perform dialing according to the recognized information. People only need to input a voice instruction, for example "dial Zhang San's mobile phone", to the microphone of the terminal equipment (including a fixed terminal or a mobile terminal), the terminal equipment can establish a call between the user and the called person, thereby significantly simplifying the users' operation. In addition to this application of voice dialing, the voice control technology is also widely used in various products such as robots and garage with a voice controlling switch.

The basic principle of the voice control technology will be introduced below by taking voice dialing as an example.

The terminal equipment firstly generates a syntax packet according to various contact information contained in the Contacts, for example name, address, contact way, etc, and this syntax packet contains voice data of the above contact information; then the terminal equipment receives, via an audio signal receiving interface such as a microphone, a voice signal input by the user, and recognizes the voice according to the received voice signal and the generated syntax packet, and judges whether the voice data of each word in the received voice signal is stored in the syntax packet; if yes, it is considered that this word is recognized from the received voice signal. When the proportion of the words recognized from the received voice signal in all words contained in the received voice signal exceeds a certain predetermined threshold, it is determined that the received voice signal is successfully recognized, and the corresponding subsequent processing is executed. For example, if the terminal equipment regulates that recognition success is determined when 60% of the words can be successfully recognized, and the voice input by the user is "dial Zhang San's mobile phone", then it is considered that recognition is successful if the terminal equipment can recognize the syllables of more than four words among them (7*60%=4.2), and the subsequent dialing flow is executed; otherwise it is considered that recognition fails, and processing is ended.

In order that the corresponding dialing processing can be performed efficiently according to the recognized information after the voice is successfully recognized, it is generally regulated in advance that when a voice is recognized, the threshold of the proportion of the recognized words in the total words contained in the received voice signal when judging whether voice recognition is successful or not is relatively high. However, in reality, many reasons will lead to the result that the proportion of the recognized words can hardly reach the predetermined threshold, thus causing failure of voice recognition, and hence causing the processing to end, for example the user unconsciously inputs a long paragraph, which only includes a few words that are associated with the dialing action, which will generally cause failure of recognition and ending of the processing since the proportion of the words that can be recognized can not reach the predetermined threshold; for another example, the terminal equipment can only recognize few words due to the accent of the user, which will also cause ending of the processing since the proportion of the words that can be recognized can not reach the predetermined threshold. Therefore, the success rate of the existing voice control technology is very low.

SUMMARY OF THE INVENTION

In view of the above, the main objective of the examples of the present invention is to provide a method for voice control so as to solve the problem of low success rate of voice control in the related art. Correspondingly, an example of the present invention also provides a device for voice control.

In order to solve the above technical problem, the technical solution provided by the example of the present invention is as follows:

A method for voice control, comprising the following steps: classifying stored recognition information used for voice recognition to obtain a syntax packet corresponding to each type of recognition information; receiving an inputted voice signal, and performing a voice recognition processing respectively on the received voice signal by using each obtained syntax packet in turn; and performing a corresponding control processing based on a voice recognition result of the voice signal according to each syntax packet.

Preferably, the step of performing a voice recognition processing on the received voice signal according to each syntax packet specifically comprises: when at least one piece of recognition information in the syntax packet can be recognized from the received voice signal, selecting an identifier corresponding to the recognized recognition information from identifiers corresponding to various recognition information in the pre-designated syntax packet as the voice recognition result of the syntax packet on the voice signal; otherwise determining that voice recognition of this time fails, and selecting an identifier corresponding to a reason for voice recognition processing failure of this time from identifiers corresponding to pre-designated various reasons for voice recognition processing failure as the voice recognition result of the syntax packet on the voice signal.

Preferably, the step of performing a corresponding control processing on a voice recognition result of the voice signal according to each syntax packet specifically comprises: when there is at least one identifier corresponding to the reason for voice recognition processing failure in the voice recognition result of each syntax packet on the voice signal, outputting a prompt signal for prompting voice recognition failure.

Preferably, the step of performing a corresponding control processing on a voice recognition result of the voice signal according to each syntax packet specifically comprises: counting a number of identifiers corresponding to a same reason for voice recognition processing failure in the voice recognition result of each syntax packet on the voice signal, and prompting a user for the reason for voice recognition processing failure corresponding to the identifier of the largest number through a prompt message.

Preferably, the step of performing a corresponding control processing on a voice recognition result of the voice signal according to each syntax packet specifically comprises: when there is no identifier corresponding to the reason for voice recognition processing failure in the voice recognition result of the designated syntax packet on the voice signal, performing a predetermined control processing corresponding to the voice recognition result of the designated syntax packet on the voice signal according to the voice recognition result of the designated syntax packet on the voice signal.

Preferably, the step of performing a corresponding control processing based on a voice recognition result of the voice signal according to each syntax packet specifically comprises: combining the voice recognition results of various syntax packets on the voice signal in a predetermined combining order, and sending a combination result to external equipment; and, receiving a query request sent from the external equipment, and the query request comprising a splitting result obtained after the external equipment splits the combination result in a splitting order corresponding to the predetermined combining order; and, selecting recognition information corresponding to the splitting result contained in the query request from a pre-designated corresponding relationship between the recognition information and the identifier; providing the recognition information corresponding to the splitting result to the external equipment, and the external equipment performing the control processing according to the recognition information corresponding to the splitting result.

Preferably, the recognition information used for voice recognition comprises information of contact name type, information of contact way type and information of operation type.

A device for voice control, comprising:

a syntax packet obtaining unit, which is used to classify stored recognition information used for voice recognition to obtain a syntax packet corresponding to each type of recognition information;

a voice recognition processing unit, which is used to receive an inputted voice signal, and perform a voice recognition processing respectively on the received voice signal by using each syntax packet obtained by the syntax packet obtaining unit in turn;

a performing unit, which is used to perform a corresponding control processing based on a voice recognition result of the voice signal according to each syntax packet.

Preferably, the voice recognition processing unit specifically comprises:

a first determining sub-unit, which is used to, for reach syntax packet obtained by the syntax packet obtaining unit, when at least one piece of recognition information in the syntax packet can be recognized from the received voice signal, select an identifier corresponding to the recognized recognition information from identifiers corresponding to various recognition information in the pre-designated syntax packet as the voice recognition result of the syntax packet on the voice signal;

a second determining sub-unit, which is used to, when no recognition information in the syntax packet can be recognized from the received voice signal, determine that voice recognition of this time fails, and select an identifier corresponding to a reason for voice recognition processing failure of this time from identifiers corresponding to pre-designated various reasons for voice recognition processing failure as the voice recognition result of the syntax packet on the voice signal.

A device for voice control connected with external equipment, comprising:

a syntax packet obtaining unit, which is used to classify stored recognition information used for voice recognition to obtain a syntax packet corresponding to each type of recognition information;

a voice recognition processing unit, which is used to receive an inputted voice signal, and perform a voice recognition processing respectively on the received voice signal by using each syntax packet obtained by the syntax packet obtaining unit in turn;

a combining sub-unit, which is used to combine the voice recognition results of various syntax packets obtained by the voice recognition processing unit on the voice signal in a predetermined combining order, and send a combination result to the external equipment;

a receiving sub-unit, which is used to receive a query request sent from the external equipment, where the query request comprises a splitting result obtained after the external equipment splits the combination result in a splitting order corresponding to the predetermined combining order;

a selecting sub-unit, which is used to select recognition information corresponding to the splitting result contained in the query request received by the receiving sub-unit from a pre-designated corresponding relationship between the recognition information and an identifier;

a sending sub-unit, which is used to provide the recognition information corresponding to the splitting result selected by the selecting sub-unit to the external equipment so that the external equipment performs the control processing according to the recognition information corresponding to the splitting result.

In the solution provided by the example of the present invention, syntax packets required for voice recognition are generated according to different types of recognition information, rather than generating one syntax packet according to all the recognition information as in the related art, and then voice recognition processing is performed on the received voice signal respectively according to each syntax packet. Regardless of the total number of words contained in the received voice signal, when the recognition information in every syntax packet can be recognized from the received voice signal, or when the recognition information in part of the syntax packets can be recognized from the received voice signal, the subsequent control processing is performed according to the recognized recognition information, thereby improving the success rate of voice control.

SPECIFIC EMBODIMENTS

The inventor found, during the process of carrying out the voice control technology including voice dialing, that the success rate of voice control is very low, and the main reason is that it is regulated in the existing voice control technology that when voice recognition processing is performed on the voice signal input by the user through the microphone, the subsequent processing can only be performed when the ratio of the number of recognized words to the total number of words contained in the voice signal exceeds a predetermined threshold. In fact, however, in many cases although the recognized words are sufficient to direct the subsequent processing, voice dialing fails due to the reason that the ratio of the number of recognized words to the total number of words contained in the voice signal is still lower than the predetermined threshold. Nevertheless, it is not reasonable to decrease the predetermined threshold for voice recognition purely in order to solve the above problem, since this will lead to the result that the subsequent processing cannot be completed in many cases due to too few recognized words. As can be seen, the existing voice control technology is inflexible in the voice recognition processing step.

It is proposed in the example of the present invention that syntax packets required for voice recognition are generated according to different types of recognition information, and then voice recognition processing is performed on the received voice signal respectively according to each syntax packet; according to a voice recognition result of each syntax packet, the subsequent processing can be performed when the result contains the information necessary for performing the subsequent processing, thereby improving the success rate of voice control.

The main implementation principle of the technical solution of the example of the present invention, specific embodiments and the corresponding beneficial effects achieved thereby will be expounded in detail below with reference to each drawing.

Figure 1:
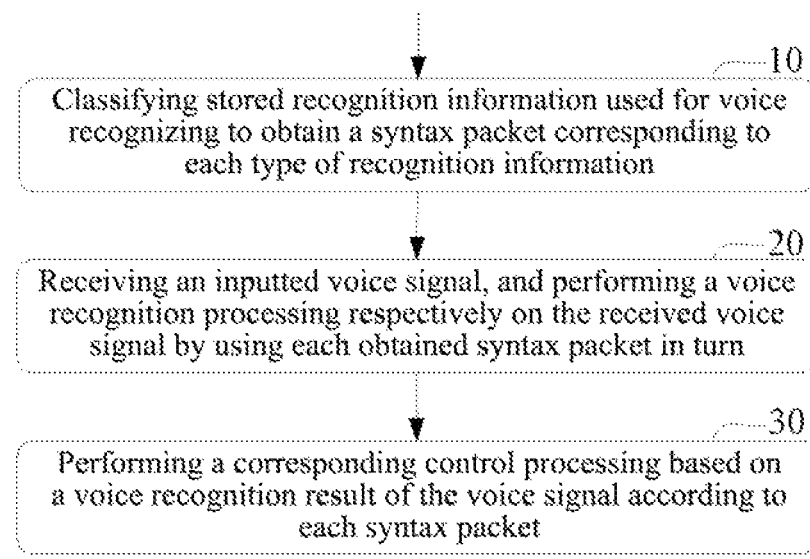
FIG. 1 illustrates the flow of the main implementation principle of an example of the present invention.

As shown in FIG. 1, the flow of the main implementation principle of the example of the present invention is as follows:

Step 10, classifying stored recognition information used for voice recognition to obtain a syntax packet corresponding to each type of recognition information;

Step 20, receiving an inputted voice signal, and performing a voice recognition processing respectively on the received voice signal by using each syntax packet obtained in step 10 in turn;

Step 30, performing a corresponding control processing based on a voice recognition result of the voice signal according to each syntax packet obtained in step 20.

In the above step 20, a voice recognition processing is performed on the received voice signal according to each syntax packet respectively to obtain the voice recognition result in the following way:

for each syntax packet, according to the identifiers corresponding to various recognition information in the pre-designated syntax packet, an identifier corresponding to the recognition information in the syntax packet recognized from the received voice signal is taken as the voice recognition result of the syntax packet on the voice signal, for example, if it is recognized through voice recognition processing that the received voice signal contains the contact name information "Zhang San" included in the syntax packet according to the voice signal data of each contact name information contained in the first syntax packet, the predetermined identifier corresponding to "Zhang San" is taken as the voice recognition result of the first syntax packet on the voice signal.

In practical implementation process, in consideration of the flexibility of the configuration of functional modules, the functions of step 10, step 20 and step 30 can be performed by two different functional modules, i.e., the first module and the second module, or two devices respectively. In order that there is no excessive parameters transmitted therebetween (i.e., one module transmits the voice recognition result of each syntax packet on the voice signal to another one) when there are too many syntax packets, after the first module obtains the voice recognition result of each syntax packet on the voice signal, the results can be combined into one result and then sent to the second module, and the second module carries out a splitting processing corresponding to the combining processing, and performs the corresponding processing according to the splitting result. For example, a device for voice control connected with external equipment is used to execute step 10 and step 20, and the external equipment is used to execute step 30, specifically:

In step 20, the device for voice control combines the voice recognition results of various syntax packets on the voice signal in a predetermined combining order, and takes the combination result as the voice recognition result corresponding to the voice signal. For example, there are two syntax packets in total, namely, the first syntax packet and the second syntax packet, wherein, the voice recognition result of the first syntax packet on the voice signal is the identifier of "Zhang San", while the voice recognition result of the second syntax packet on the voice signal is the identifier of "mobile phone", then after the voice recognition result of the first syntax packet on the voice signal and the voice recognition result of the second syntax packet on the voice signal are combined in an order of the voice recognition result of the first syntax packet on the voice signal followed by the voice recognition result of the second syntax packet on the voice signal, the combination result (the identifier of "Zhang San"+ the identifier of "mobile phone") is taken as the voice recognition result of the received voice signal.

The device for voice control sends the voice recognition result of the voice signal obtained through combination to the external equipment;

correspondingly, the external equipment splits the combination result in a splitting order corresponding to the predetermined combining order in step 20, and carries the splitting result in a query request to be transmitted to the device for voice control;

the device for voice control receives the query request sent from the external equipment, and selects recognition information corresponding to the splitting result contained in the query request from a pre-designated corresponding relationship between the recognition information and the identifier, and provides the recognition information corresponding to the splitting result to the external equipment;

the external equipment performs the control processing according to the recognition information corresponding to the splitting result.

In the above various steps, the identifier corresponding to the contact information recognized in each syntax packet is used as the voice recognition result, the voice recognition results of various syntax packets are combined as the voice recognition result of the received voice signal and are split subsequently, the corresponding processing is performed according to the splitting result because the storage space required by the identifier is relatively small as compared with the character string, thus improving the processing efficiency of the terminal equipment.

The main implementation principle will be expounded and described in detail below based on the above inventive principle of the embodiments of present invention through introducing a specific example by taking voice dialing as an example.

The Contacts of the terminal equipment store various contact information, and the contact information in this example is classified (in fact many terminal equipment has already classified the contact information when storing the information, so this step may be omitted), for example, the contact information is classified into: information of contact name type including "Zhang San" and "Li Si", information of contact way type including "mobile phone" and "landline phone", and information of operation type including "dialing" and "calling", etc.

Figure 2:
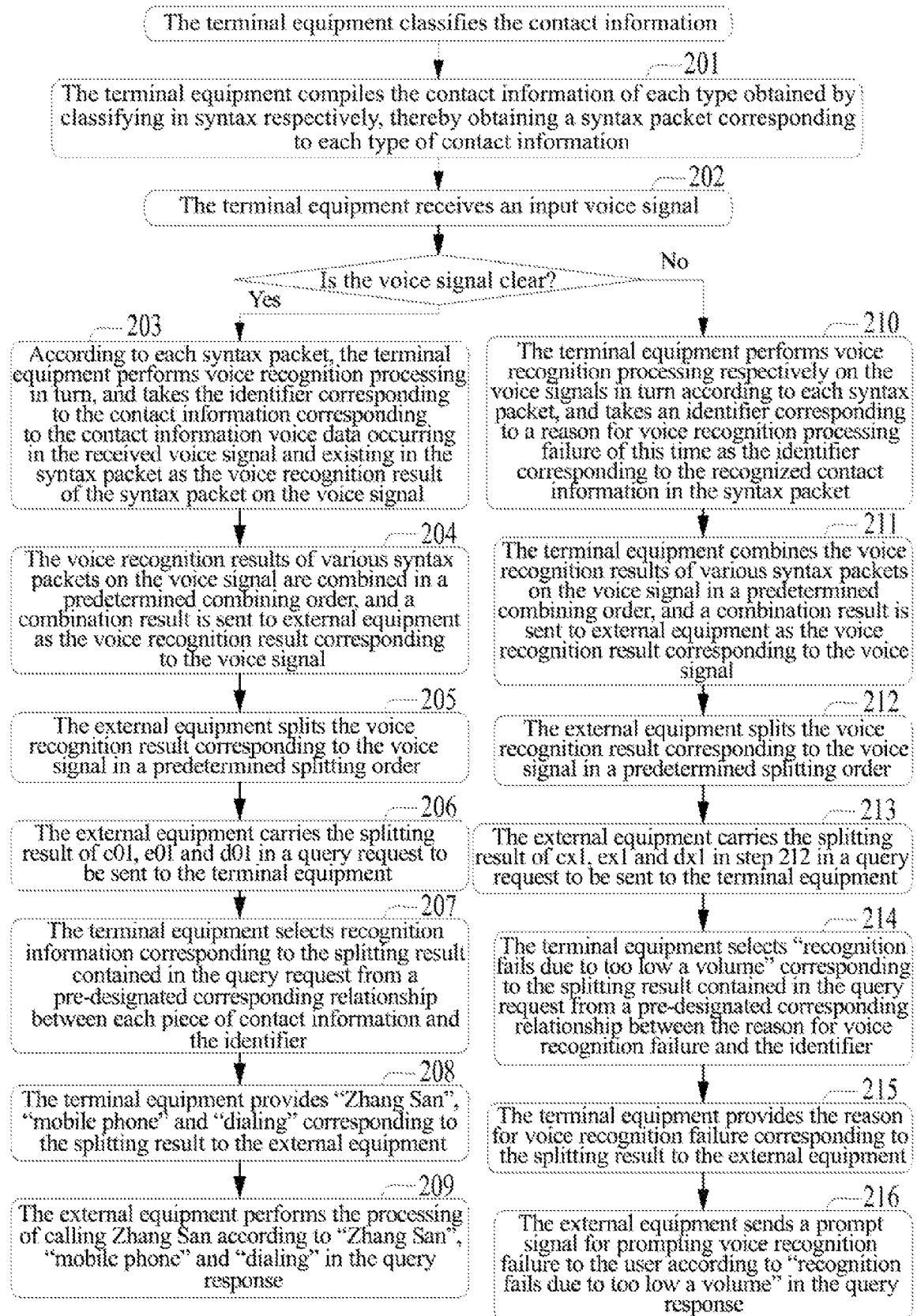
FIG. 2 illustrates the flow of the specific process of voice dialing according to an example of the present invention.

Referring to FIG. 2, in step 201, the contact information of each type obtained by classifying is compiled in syntax respectively, thereby obtaining a syntax packet corresponding to each type of contact information and containing the voice data of this type of contact information. The specific technology for obtaining syntax packets through compilation belongs to the related art, and thus will not be described here in detail. In this example, the first syntax packet corresponding to the information of contact name type, the second syntax packet corresponding to the information of contact way type and the third syntax packet corresponding to the information of operation type are obtained respectively.

In view of the performing efficiency of the terminal equipment, a corresponding identifier is preset for each piece of contact information when syntax packets are generated, and this identifier may be a character string of a predetermined length. For example in this example, the identifier corresponding to each piece of contact name information is a 3-bit character string starting with "c", where the identifier corresponding to "Zhang San" is c01 and the identifier corresponding to "Li Si" is c01; the identifier corresponding to each piece of contact way information is a 3-bit character string starting with "e", where the identifier corresponding to "mobile phone" is e01, the identifier corresponding to "office phone" is e02, and the identifier corresponding to "home phone" is e03; the identifier corresponding to each piece of operation information is a 3-bit character string starting with "d", where the identifier corresponding to "dialing" is d01, and the identifier corresponding to "querying" is d02.

Preferably, a predetermined number of identifiers corresponding to various reasons for voice recognition processing failure can also be set, for example, in this example the identifier corresponding to each kind of failure reason is a 3-bit character string starting with "cx", where the identifier corresponding to "the sound of the input voice is too small" is cx1.

In step 202, the terminal equipment receives a voice signal input by the user through a voice input interface such as a microphone, for example, the user inputs "dial Zhang San's mobile phone for me". In order to facilitate description of the solution provided in this example, it is assumed that there are two scenes:

Scene 1: the volume of the user is sufficient to meet the need of voice recognition, and every word can be recognized from the voice signal input by the user, proceed to step 203;

Scene 2: the volume of the user is very low and can hardly meet the need of voice recognition, every word cannot be recognized from the voice signal input by the user, proceed to step 210;

In step 203, according to each syntax packet among the three syntax packets obtained in step 201, the terminal equipment performs voice recognition processing on the voice signal received in step 202 in turn (i.e., loading each syntax packet obtained in step 201 in the voice recognition processing module), takes the identifier corresponding to the contact information corresponding to the contact information voice data occurring in the received voice signal and existing in the syntax packet as the voice recognition result of the syntax packet on the voice signal, proceed to step 204;

for example, voice recognition processing is performed on the voice signal input by the user firstly according to the first syntax packet, it can be recognized that the voice signal input by the user contains "Zhang San", and then the identifier c01 corresponding to "Zhang San" is taken as the voice recognition result of the first syntax packet on the received voice signal; similarly, voice recognition processing is performed on the voice signal input by the user according to the second syntax packet, it can be recognized that the voice signal input by the user contains "mobile phone", and then the identifier e01 corresponding to "mobile phone" is taken as the voice recognition result of the second syntax packet on the received voice signal;

then, voice recognition processing is performed on the voice signal input by the user according to the third syntax packet, it can be recognized that the voice signal input by the user contains "dialing", and then the identifier d01 corresponding to "dialing" is taken as the voice recognition result of the third syntax packet on the received voice signal.

In step 204, the voice recognition results of various syntax packets obtained in step 203 on the voice signal are combined in a predetermined combining order, and a combination result is sent to external equipment as the voice recognition result corresponding to the voice signal, proceed to step 205;

in this example, the voice recognition results of various syntax packets are combined together in an order of placing the voice recognition result of the first syntax packet first, placing the voice recognition result of the second syntax packet second and placing the voice recognition result of the second syntax packet third, and the combination result of c01e01d01 is taken as the voice recognition result of the voice signal received in step 202.

In step 205, the external equipment splits the voice recognition result corresponding to the voice signal in a splitting order corresponding to the combining order in step 204, and obtains three identifiers of c01, e01 and d01 respectively, proceed to step 206.

In step 206, the external equipment carries the splitting result of c01, e01 and d01 in step 205 in a query request to be sent to the terminal equipment.

In step 207, the terminal equipment selects recognition information corresponding to the splitting result contained in the query request from a pre-designated corresponding relationship between each piece of contact information and the identifier, for example, "Zhang San" corresponding to c01 is selected, and "dialing" corresponding to e01 and "mobile phone" corresponding to d01 are selected.

In step 208, the terminal equipment provides the recognition information corresponding to the splitting result in step 207 to the external equipment, for example, by carrying it in a query response sent to the external equipment.

In step 209, the external equipment performs the processing of calling Zhang San according to "Zhang San" corresponding to c01, "mobile phone" corresponding to e01 and "dialing" corresponding to d01 in the query response.

In step 210, the terminal equipment performs voice recognition processing respectively on the voice signals received in step 202 in turn according to each syntax packet among the three syntax packets obtained in step 201; since no contact information contained in the syntax packet can be recognized from the received voice signal, it is determined that the voice recognition of this time fails, and an identifier corresponding to a reason for voice recognition processing failure of this time is selected from identifiers corresponding to pre-designated various reasons for voice recognition processing failure as the identifier corresponding to the recognized contact information in the syntax packet, proceed to step 211;

for example, voice recognition processing is performed on the voice signal input by the user firstly according to the first syntax packet, and since no contact name information in the first syntax packet can be recognized from the received voice signal, the pre-designated identifier cx1 corresponding to "recognition fails due to too low a volume" is taken as the voice recognition result of the first syntax packet on the received voice signal;

similarly, voice recognition processing is performed on the voice signal input by the user firstly according to the second syntax packet, and since no contact way information in the second syntax packet can be recognized from the received voice signal, the pre-designated identifier ext corresponding to "recognition fails due to too low a volume" is taken as the voice recognition result of the second syntax packet on the received voice signal;

then, voice recognition processing is performed on the voice signal input by the user firstly according to the third syntax packet, and since no operation information in the third syntax packet can be recognized from the received voice signal, the pre-designated identifier dx1 corresponding to "recognition fails due to too low a volume" is taken as the voice recognition result of the third syntax packet on the received voice signal.

In step 211, the voice recognition results of various syntax packets obtained in step 210 on the voice signal are combined in a predetermined combining order, and a combination result is sent to external equipment as the voice recognition result corresponding to the received voice signal, proceed to step 212;

in this example, the voice recognition results of various syntax packets are combined together in an order of placing the voice recognition result of the first syntax packet first, placing the voice recognition result of the second syntax packet second and placing the voice recognition result of the second syntax packet third, and the combination result of cx1ex1dx1 is taken as the voice recognition result of the voice signal received in step 202.

In step 212, the external equipment splits the voice recognition result corresponding to the voice signal in a splitting order corresponding to the combining order in step 211, and obtains three identifiers of cx1, ex1 and dx1 respectively, proceed to step 213.

In step 213, the external equipment carries the splitting result of cx1, ex1 and dx1 in step 212 in a query request to be sent to the terminal equipment.

In step 214, the terminal equipment selects the reason for voice recognition failure corresponding to the splitting result contained in the query request from a pre-designated corresponding relationship between the reason for voice recognition failure and the identifier, for example "recognition fails due to too low a volume".

In step 215, the terminal equipment provides the reason for voice recognition failure corresponding to the splitting result in step 214 to the external equipment, for example, by carrying it in a query response to be sent to the external equipment.

In step 216, the external equipment judges that the subsequent processing cannot be performed according to the reason for voice recognition failure corresponding to the splitting result in the query response, and sends a prompt signal for prompting voice recognition failure to the user.

The two scenes provided in step 202 are both extreme cases. In practice, there usually exists such a case where the contact information contained in the syntax packet can be recognized from the received voice signal when voice recognition processing is performed using part of the syntax packets, but voice recognition fails when voice recognition processing is performed using the rest part of the syntax packets. In this case, the following adaptive solution can be adopted:

When it is determined that there is at least one syntax packet whose voice recognition result on the voice signal is the identifier corresponding to the reason for voice recognition processing failure, a prompt message is sent to the user, and the user is prompted about voice recognition failure by the prompt message, optionally, the terminal equipment judges, according to the feedback information after the user receives the prompt signal, whether to further determine the reason for voice recognition processing failure according to the identifier corresponding to the reason for voice recognition processing failure; or, preferably, the number of identifiers corresponding to a same reason for voice recognition processing failure in the voice recognition results of all syntax packets on the voice signal is counted, and a user is prompted of the reason for voice recognition processing failure corresponding to the identifier of the largest number through a prompt message; or, when the number of identifiers corresponding to the reason for voice recognition processing failure in the voice recognition results of all syntax packets on the voice signal exceeds a predetermined threshold, a prompt signal is output according to the reason for voice recognition processing failure corresponding to the identifier of the largest number corresponding to the same reason for voice recognition processing failure; otherwise, the corresponding processing is performed according to the splitting result, or, when the voice recognition results of part of syntax packets on the voice signal are pre-designated not the identifiers corresponding to voice recognition processing failure (i.e., the identifier corresponding to each reason for voice recognition processing failure), the corresponding processing is performed according to the voice recognition result of the part of syntax packets, for example, when the voice recognition results of the first and third syntax packets on the voice signal are pre-designated not to be the identifier corresponding to voice recognition processing failure, for example, the voice recognition result of the first syntax packet is cx1 (the corresponding contact information is "Zhang San"), and the voice recognition result of the third syntax packet is dx1 (the corresponding contact information is "dialing"), then the Zhang San's mobile phone or office phone can be dialed.

In the above step 203 or 210, since voice recognition processing is performed according to the syntax packet with a relatively small data amount corresponding to each type of contact information, rather than performing voice recognition processing according to a syntax packet with a big data amount including all contact information as in the related art, therefore, the speed of voice recognition is accelerated, and the time spent for voice recognition processing is saved.

In the solution provided by the example of the present invention, syntax packets required for voice recognition are generated respectively according to different types of recognition information, rather than generating one syntax packet according to all contact information as in the related art, and then voice recognition processing is performed on the received voice signal respectively according to each syntax packet. When the contact information in every syntax packet can be recognized from the received voice signal, or when the contact information in part of the syntax packets can be recognized from the received voice signal, the subsequent control processing is performed according to the recognized contact information, rather than that the subsequent processing can only be performed when the proportion recognized syllables of the contact information in all syllables contained in the voice signal exceeds a predetermined threshold as in the related art, otherwise the recognition is deemed to fail and the processing is ended, which ignores whether the contact information recognized at this moment is sufficient to support execution of subsequent processing. Therefore, the solution for voice control provided by the example of the present invention solves the problem of low success rate of voice control in the related art.

Figure 3:
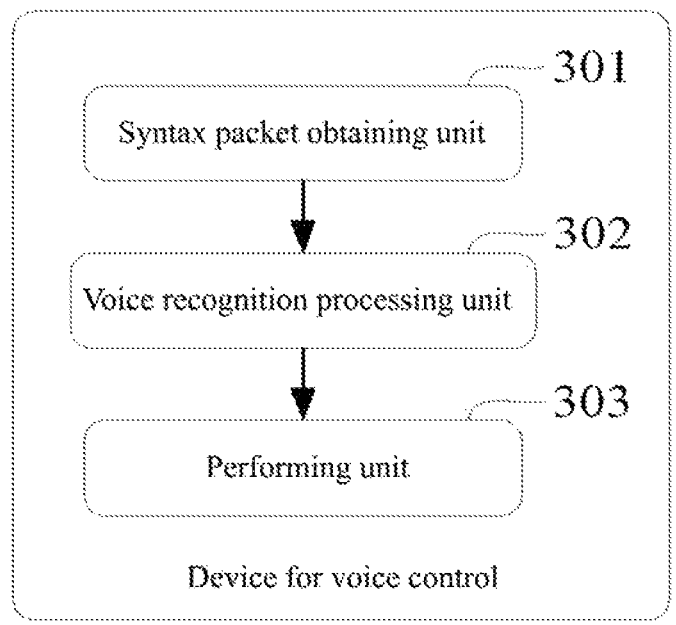
FIG. 3 illustrates the structure of a device for voice control provided in an example of the present invention.

Correspondingly, the example of the present invention also provides a device for voice control, as shown in FIG. 3, the device comprises: a syntax packet obtaining unit 301, a voice recognition processing unit 302 and a performing unit 303, specifically:

the syntax packet obtaining unit 301 is used to classify stored recognition information used for voice recognition to obtain a syntax packet corresponding to each type of recognition information;

the voice recognition processing unit 302 is used to receive an inputted voice signal, and perform a voice recognition processing respectively on the received voice signal by using each syntax packet obtained by the syntax packet obtaining unit in turn;

the performing unit 303 is used to perform a corresponding control processing on a voice recognition result of the voice signal according to each syntax packet.

Figure 4:
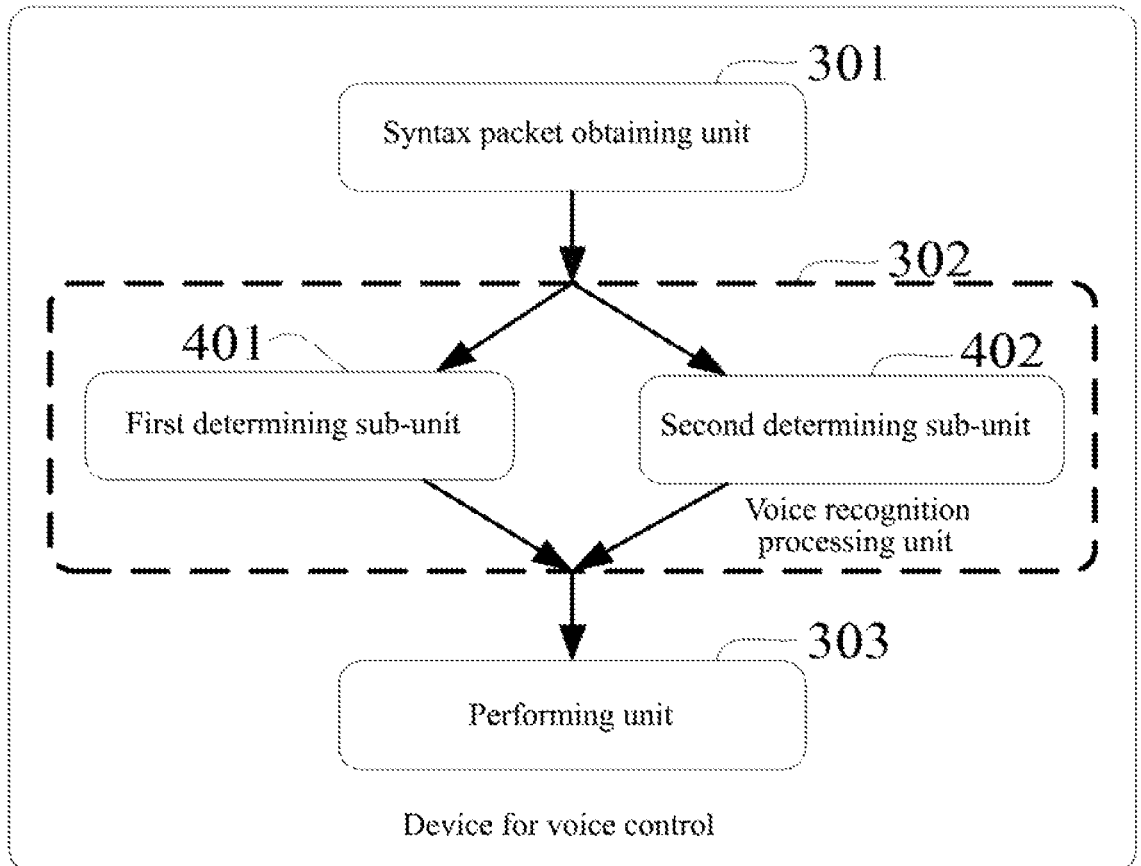
FIG. 4 illustrates the structure of another device for voice control provided in an example of the present invention.

Referring to FIG. 4, in the device for voice control shown in FIG. 3, the voice recognition processing unit 302 specifically comprises a first determining sub-unit 401 and a second determining sub-unit 402, wherein:

the first determining sub-unit 401 is used to, for reach syntax packet obtained by the syntax packet obtaining unit, when at least one piece of recognition information in the syntax packet can be recognized from the received voice signal, select an identifier corresponding to the recognized recognition information from identifiers corresponding to various recognition information in the pre-designated syntax packet as the voice recognition result of the syntax packet on the voice signal;

the second determining sub-unit 402 is used to, when no recognition information in the syntax packet can be recognized from the received voice signal, determine that voice recognition of this time fails, and select an identifier corresponding to a reason for voice recognition processing failure of this time from identifiers corresponding to pre-designated various reasons for voice recognition processing failure as the voice recognition result of the syntax packet on the voice signal.

Figure 5:
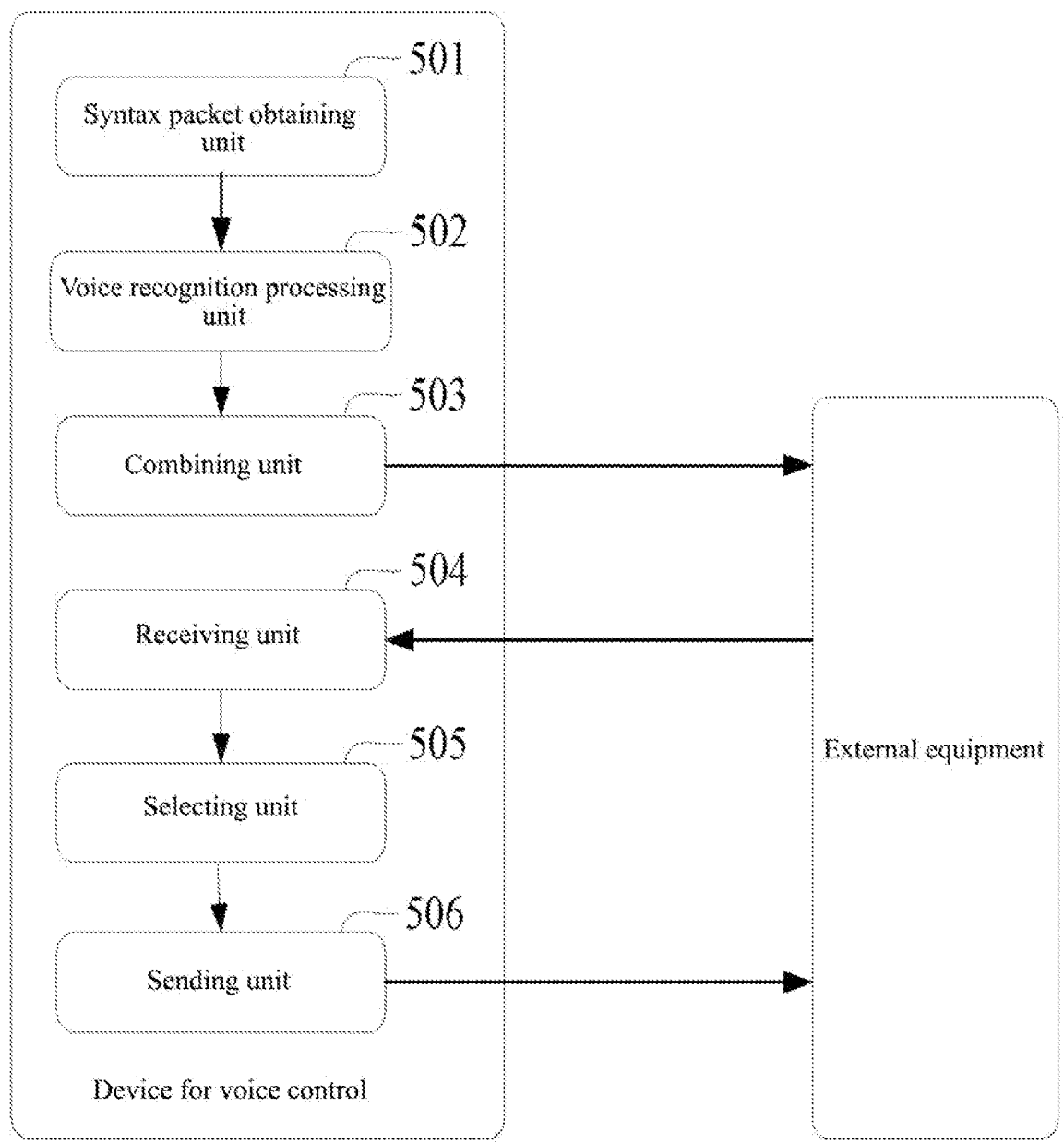
FIG. 5 illustrates the structure of still another device for voice control provided in an example of the present invention.

Preferably, referring to FIG. 5, it illustrates the structure of another device for voice control provided in an example of the present invention. The device for voice control is connected with external equipment and comprises a syntax packet obtaining unit 501, a voice recognition processing unit 502, a combining unit 503, a receiving unit 504, a selecting unit 505 and a sending unit 506, wherein:

the syntax packet obtaining unit 501 is used to classify stored recognition information used for voice recognition to obtain a syntax packet corresponding to each type of recognition information;

the voice recognition processing unit 502 is used to receive an inputted voice signal, and perform a voice recognition processing respectively on the received voice signal by using each syntax packet obtained by the syntax packet obtaining unit 501 in turn;

a combining unit 503 is used to combine the voice recognition results of various syntax packets obtained by the voice recognition processing unit on the voice signal in a predetermined combining order, and send a combination result to the external equipment;

the receiving unit 504 is used to receive a query request sent from the external equipment, where the query request comprises a splitting result obtained after the external equipment splits the combination result in a splitting order corresponding to the predetermined combining order;

a selecting unit 505 is used to select recognition information corresponding to the splitting result contained in the query request received by the receiving unit 504 from a pre-designated corresponding relationship between the recognition information and an identifier;

the sending sub-unit 506 is used to provide the recognition information corresponding to the splitting result selected by the selecting sub-unit to the external equipment so that the external equipment performs the control processing according to the recognition information corresponding to the splitting result.

A person having ordinary skill in the art can appreciate that all or part of the steps in the above steps can be implemented by instructing related hardware through a grogram, which may be stored in a computer readable storage medium, such as read-only memory, disk or an optical disk, and so on.

Obviously, a person having ordinary skill in the art can make various modifications and transformations to the present invention without departing from the sprit and scope of the present invention. Thus, if these modifications and transformations to the present invention fall into the scope of the present invention and equivalent technology thereof, then the present invention is also intended to include these modifications and transformations.

What is claimed is:

1. A method for voice control, comprising the following steps:

classifying stored recognition information used for voice recognition to obtain a plurality of syntax packets, wherein each syntax packet corresponds to one type of recognition information;

receiving an inputted voice signal, and performing a voice recognition processing repeatedly on the received voice signal by using each of the plurality of syntax packets in turn to obtain a plurality of voice data portions, each of which is recognized from the corresponding syntax packet, of the voice signal as a plurality of voice recognition results, wherein the plurality of voice recognition results include some voice data portions recognized successfully and/or voice recognition failure;

wherein, the step of performing a voice recognition processing repeatedly on the received voice signal by using each of the plurality of syntax packets comprises:

when at least one piece of recognition information in one of the syntax packets can be recognized from the received voice signal, selecting an identifier corresponding to the recognized piece of the recognition information from pre-designated identifiers corresponding to various pieces of the recognition information in the syntax packet as the voice recognition result of the syntax packet on the voice signal;

otherwise, determining that voice recognition fails this time, and selecting an identifier corresponding to a reason for voice recognition processing failure of this time from pre-designated identifiers corresponding to various reasons for voice recognition processing failure as the voice recognition result of the syntax packet on the voice signal; and performing a corresponding control processing based on a combination of the plurality of voice recognition results as follows:

combining the voice recognition results of various syntax packets on the voice signal in a predetermined combining order, and sending a combination result to an external equipment;

receiving a query request sent from the external equipment, wherein the query request contains a splitting result obtained after the external equipment splits the combination result in a splitting order corresponding to the predetermined combining order;

selecting recognition information corresponding to the splitting result contained in the query request from a pre-designated corresponding relationship between the recognition information and the identifiers; and providing the recognition information corresponding to the splitting result to the external equipment, so that the external equipment performs the control processing according to the recognition information corresponding to the splitting result.

2. The method according to claim 1, wherein, the step of performing a corresponding control processing based on a combination of the plurality of voice recognition results comprises:

when there is at least one identifier corresponding to the reason for voice recognition processing failure in the voice recognition results of various syntax packets on the voice signal, outputting a prompt signal for prompting voice recognition failure.

3. The method according to claim 1, wherein, the step of performing a corresponding control processing based on a combination of the plurality of voice recognition results comprises:

counting the number of identifiers corresponding to same reasons for voice recognition processing failure in the voice recognition results of various syntax packets on the voice signal, and prompting a user through a prompt message of a reason for voice recognition processing failure corresponding to the identifier with the largest number.

4. The method according to claim 1, wherein, the step of performing a corresponding control processing based on a combination of the plurality of voice recognition results comprises:

when there is no identifier corresponding to the reason for voice recognition processing failure in the voice recognition results of the designated syntax packets on the voice signal, performing a predetermined control processing corresponding to the voice recognition results of the designated syntax packets on the voice signal according to the voice recognition results of the designated syntax packets on the voice signal.

5. The method according to claim 1, wherein, the recognition information used for voice recognition comprises information of contact name type, information of contact way type and information of operation type.

6. A device for voice control, comprising:

a syntax packet obtaining unit, which is used to classify stored recognition information used for voice recognition to obtain a plurality of syntax packets, wherein each syntax packet corresponds to one type of recognition information;

a voice recognition processing unit, which is used to receive an inputted voice signal, and perform a voice recognition processing repeatedly on the received voice signal by using each of the plurality of syntax packets in turn to obtain a plurality of voice data portions, each of which is recognized from the corresponding syntax packet, of the voice signal as a plurality of voice recognition results, wherein the plurality of voice recognition results include some voice data portions recognized successfully and/or voice recognition failure;

wherein, the voice recognition processing unit is used to perform a voice recognition processing repeatedly on the received voice signal by using each of the plurality of syntax packets as follows:

when at least one piece of recognition information in one of the syntax packets can be recognized from the received voice signal, selecting an identifier corresponding to the recognized piece of the recognition information from pre-designated identifiers corresponding to various pieces of the recognition information in the syntax packet as the voice recognition result of the syntax packet on the voice signal;

otherwise, determining that voice recognition fails this time, and selecting an identifier corresponding to a reason for voice recognition processing failure of this time from pre-designated identifiers corresponding to various reasons for voice recognition processing failure as the voice recognition result of the syntax packet on the voice signal;

a performing unit, which is used to perform a corresponding control processing based on a combination of the plurality of voice recognition results as follows:

combining the voice recognition results of various syntax packets on the voice signal in a predetermined combining order, and sending a combination result to an external equipment;

receiving a query request sent from the external equipment, wherein the query request contains a splitting result obtained after the external equipment splits the combination result in a splitting order corresponding to the predetermined combining order;

selecting recognition information corresponding to the splitting result contained in the query request from a pre-designated corresponding relationship between the recognition information and the identifiers; and providing the recognition information corresponding to the splitting result to the external equipment, so that the external equipment performs the control processing according to the recognition information corresponding to the splitting result.

7. The device according to claim 6, wherein, the voice recognition processing unit specifically comprises a first determining sub-unit and a second determining sub-unit;

wherein, for each syntax packet obtained by the syntax packet obtaining unit, the first determining sub-unit is used to, when at least one piece of recognition information in the syntax packet can be recognized from the received voice signal, select an identifier corresponding to the recognized piece of the recognition information from pre-designated identifiers corresponding to various pieces of the recognition information in the syntax packet as the voice recognition result of the syntax packet on the voice signal;

the second determining sub-unit is used to, when no recognition information in the syntax packet can be recognized from the received voice signal, determine that voice recognition fails this time, and select an identifier corresponding to a reason for voice recognition processing failure this time from pre-designated identifiers corresponding to various reasons for voice recognition processing failure as the voice recognition result of the syntax packet on the voice signal.

8. A device for voice control connected with an external equipment, comprising:
- a syntax packet obtaining unit, which is used to classify stored recognition information used for voice recognition to obtain a plurality of syntax packets, wherein each syntax packet corresponds to one type of recognition information;
- a voice recognition processing unit, which is used to receive an inputted voice signal, and perform a voice recognition processing repeatedly on the received voice signal by using each of the plurality of syntax packets obtained by the syntax packet obtaining unit in turn to obtain a plurality of voice data portions, each of which is recognized from the corresponding syntax packet, of the voice signal as a plurality of voice recognition results, wherein the plurality of voice recognition results include some voice data portions recognized successfully and/or voice recognition failure;
- wherein, the voice recognition processing unit is used to perform a voice recognition processing repeatedly on the received voice signal by using each of the plurality of syntax packets as follows:
- when at least one piece of recognition information in one of the syntax packets can be recognized from the received voice signal, selecting an identifier corresponding to the recognized piece of the recognition information from pre-designated identifiers corresponding to various pieces of the recognition information in the syntax packet as the voice recognition result of the syntax packet on the voice signal;
- otherwise, determining that voice recognition fails this time, and selecting an identifier corresponding to a reason for voice recognition processing failure of this time from pre-designated identifiers corresponding to various reasons for voice recognition processing failure as the voice recognition result of the syntax packet on the voice signal;
- a combining sub-unit, which is used to combine the voice recognition results of various syntax packets obtained by the voice recognition processing unit on the voice signal in a predetermined combining order, and send a combination result to the external equipment;
- a receiving sub-unit, which is used to receive a query request sent from the external equipment, wherein the query request contains a splitting result obtained after the external equipment splits the combination result in a splitting order corresponding to the predetermined combining order;
- a selecting sub-unit, which is used to select recognition information corresponding to the splitting result contained in the query request received by the receiving sub-unit from a pre-designated corresponding relationship between the recognition information and identifiers; and a sending sub-unit, which is used to provide the recognition information corresponding to the splitting result selected by the selecting sub-unit to the external equipment, so that the external equipment performs the control processing according to the recognition information corresponding to the splitting result.

9. The method according to claim 1, wherein, the recognition information used for voice recognition comprises information of contact name type, information of contact way type and information of operation type.

10. The method according to claim 2, wherein, the recognition information used for voice recognition comprises information of contact name type, information of contact way type and information of operation type.

11. The method according to claim 3, wherein, the recognition information used for voice recognition comprises information of contact name type, information of contact way type and information of operation type.

12. The method according to claim 4, wherein, the recognition information used for voice recognition comprises information of contact name type, information of contact way type and information of operation type.

13. The method according to claim 1, wherein, the recognition information used for voice recognition comprises information of contact name type, information of contact way type and information of operation type.

* * * * *